United States Patent [19]
Michel

[11] 3,902,463
[45] Sept. 2, 1975

[54] STEAM GENERATOR FOR PRESSURIZED WATER REACTORS

[75] Inventor: Rupprecht Michel, Erlangen, Germany

[73] Assignee: Kraftwerke Union Aktiengesellschaft, Mulheim, Germany

[22] Filed: Mar. 5, 1974

[21] Appl. No.: 448,210

[30] Foreign Application Priority Data
Mar. 14, 1973   Germany............................ 2312726

[52] U.S. Cl. .................. 122/32; 165/135; 165/158; 165/163
[51] Int. Cl.............................................. F22b 1/06
[58] Field of Search .......... 122/32, 33, 34; 165/134, 165/135, 158, 159, 163

[56] References Cited
UNITED STATES PATENTS

| | | | |
|---|---|---|---|
| 3,141,445 | 7/1964 | Bell...................................... | 122/34 |
| 3,286,696 | 11/1966 | Green et al........................... | 122/34 |
| 3,296,779 | 1/1967 | Daman et al. ..................... | 122/34 X |
| 3,360,037 | 12/1967 | Ammon.............................. | 165/158 |

Primary Examiner—Kenneth W. Sprague
Attorney, Agent, or Firm—Herbert L. Lerner

[57] ABSTRACT

In order to effect adequate cooling of the inner pressurized water-conducting tubes of a tube bundle in a steam generator for pressurized water nuclear reactors, inwardly extending free passages are formed in the tube bundle at the pressurized water inlet end of the tubes.

3 Claims, 4 Drawing Figures

PATENTED SEP 2 1975 3,902,463

STEAM GENERATOR FOR PRESSURIZED WATER REACTORS

The invention relates to a steam generator for pressurized water nuclear reactors.

Steam generators for pressurized water reactors operate in accordance with the principle of natural circulation and are formed of a U-shaped tube bundle having a free end that is welded in a plate located at the base of the generators. The tube bundle is surrounded by a cylinder jacket that is formed with openings located immediately above the tube plate. Feed-water is supplied, above the tube bundle, to an annular space and flows, intermixed with resulting boiling water, downwardly in the annular space and enters the tube bundle through the aforedescribed openings or slots formed in the cylinder jacket. The steamwater mixture flows upwardly in the tube bundle as a result of its buoyancy, and the steam is separated from the mixture in cyclone separators located thereabove.

In order to keep the diameter of the steam generator small, the tubes are disposed very close to one another. The water from the outside entering the tube bundle from below flows between the outer tubes in upward direction so that only a very slight flow exists above the middle of the tube plate at the pressurized water inlet end. Water having a very strong concentration of salts develops at that location and, depending upon the composition of the salts, can corrode the tubes in this region.

It is accordingly an object of the invention to provide a steam generator for a pressurized water reactor wherein the flow above the tube plate at the inlet end of the tube bundle is improved so that the middle tubes also receive adequate water.

With the foregoing and other objects in view, there is provided, in accordance with the invention, a steam generator for pressurized water reactors with natural circulation of water that is to be vaporized comprising a U-shaped tube bundle traversible by pressurized water, a tube plate forming a base of the steam generator and having therebeneath a pressurized water distributing chamber and a pressurized water reservoir chamber, the tube bundle being mounted on the tube plate, and a water guide cylinder surrounding the tube bundle and formed at the peripheral surface thereof with radially extending inlet openings into the tube bundle for the water that is to be vaporized, the tubes of the tube bundle being arrayed so as to form a free passage above the pressurized water distributing chamber in at least one region extending rectilinearly between the middle of the tube bundle and one of the inlet openings for the water that is to be vaporized.

In accordance with another feature of the invention, the pressurized water distributing chamber and the pressurized water reservoir chamber located below the tube plate are separated by a partition, and a pressurized water inlet is connected to the distributing chamber and a pressurized water outlet is connected to the reservoir chamber, the partition being disposed asymmetrically between the inlet and the outlet, and the free passage being thereby located only at the pressurized water inlet side of the generator.

In accordance with a further feature of the invention, a plurality of the tubes of the tube bundle located adjacent the free passage are formed with forked sections above the inlet openings for the water that is to be vaporized, and additional tubes are connected to the forked sections in a space above the free passage, the additional tubes below the forked sections having substantially double the cross section, respectively, of the tubes of the tube bundle.

Other features which are considered as characteristic for the invention are set forth in the appended claims.

Although the invention is illustrated and described herein as embodied in a steam generator for pressurized water reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
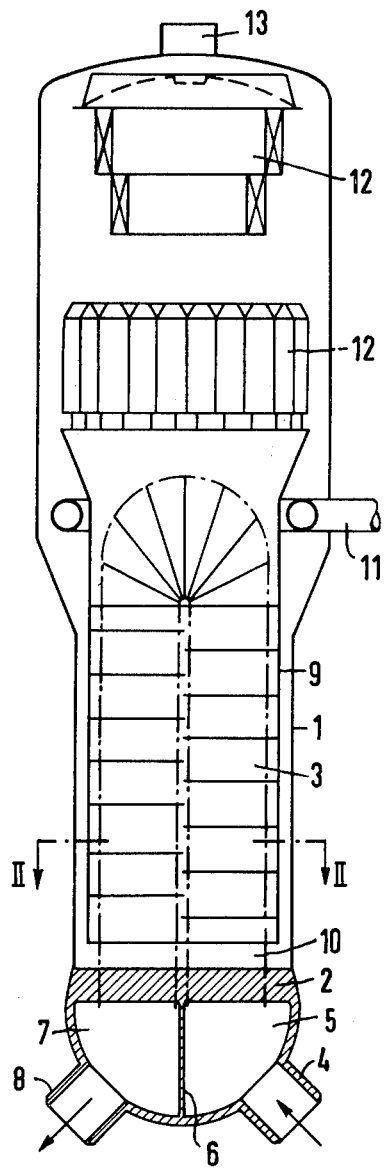
FIG. 1 is a diagrammatic view, partly in section, of a steam generator for pressurized water reactors with natural circulation that is constructed in accordance with the invention.

Referring now to the drawing and first, particularly to FIG. 1 thereof, there is shown therein a steam generator 1 for a pressurized water reactor, constructed in accordance with the invention. The steam generator 1 is bounded at the bottom thereof by a tube plate 2, in which a tube bundle 3 of U-shaped construction is welded. Only the innermost and outermost tubes of the tube bundle 3 are shown in FIG. 1, represented by the respective center lines thereof shown as dot-dash lines. A pressurized water inlet 4 leads to a pressurized water distributing chamber 5 which is separated by a partition 6 from a pressurized water reservoir 7 from which the pressurized water flows out through an outlet 8. The tube bundle 3 is surrounded by a water guide cylinder or jacket 9 which is mounted coaxially within the housing of the steam generator 1 and is formed at the lower end thereof with inlet openings 10 providing radially extending entry paths of the water flowing downwardly between the water guide cylinder 9 and the housing of the steam generator. A feed tube 11 serves for supplying feedwater, while a steam-water separator 12 of conventional construction in the upper part of the steam generator ensures that the steam flowing out of the outlet 13 is dried.

Figure 2:
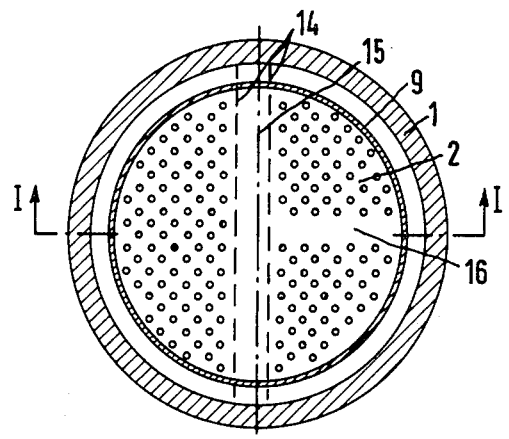
FIG. 2 is an enlarged sectional view of FIG. 1 taken along the line II—II in the direction of the arrows.

In contrast to heretofore known steam generators, the partition 6 between the pressurized water distributing chamber 5 and the pressurized water reservoir 7 is not symmetrically disposed. This can be readily discerned in FIG. 2 by the fact that the broken boundary lines do not lie symmetrically to the center line 15 of the steam generator 1. Therefore the right-hand part of the tube plate 2 shown in FIG. 2 has a greater area than the left-hand part of the tube plate 2 that is located adjacent the broken lines 14. The number of tubes in both parts of the tube plate 2 is the same. In the right-hand part of the tube plate 2, as viewed in FIG. 2, a free passage 16 is located in a region extending rectilinearly between the middle of the tube bundle and the water guide cylinder 9. As the water to be vaporized flows in through the inlet 10, the water that flows into this passage 16 will advance up to the inner tubes of the tube bundle so that a flow dead space having very strong salt concentration will thereby be avoided. An advantage deriving therefrom is that the inner tubes will no longer corrode above the tube plate and will participate fully with the surface thereof to heat exchange as compared to a steam generator with a symmetrical tube bundle and without a free passage, the totally effective heatexchanging surface in the steam generator of the invention in this application is reduced only by the tubes missing in the passage on one side of the tube bundle.

Figure 3:
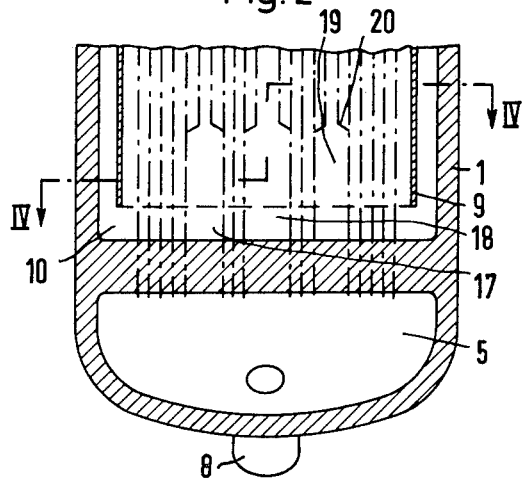
FIG. 3 is a sectional view, much enlarged over that of FIG. 1, of the bottom end of another embodiment of the invention.
Figure 4:
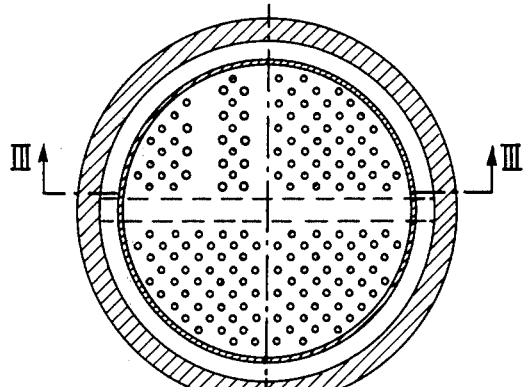
FIG. 4 is a cross sectional view of FIG. 3 taken along the line IV—IV in the direction of the arrows.

FIGS. 3 and 4 illustrate another embodiment of the invention. Three free passages are formed above the stream distributing chamber 5 by omitting some of the tubes. The partition, which is not shown in FIG. 3 is symmetrically disposed as in the heretofore known steam generators, however, the tubes adjacent the free passages 17, 18 and 19 have a somewhat enlarged cross section. They are formed with forked sections 20 located above the inlet 10 for the pressurized water. The forked sections 20 are connected to tubes which occupy the free passages 17, 18 and 19 above the forked sections 20. In this way, inlet passages are produced for the water to be vaporized without reducing the heat-exchanging heating surfaces as compared to heretofore known structures.

I claim:

1. Steam generator for pressurized water reactors with natural circulation of water that is to be vaporized comprising a U-shaped tube bundle traversible by pressurized water, a tube plate forming a base of the steam generator and having therebeneath a pressurized water distributing chamber and a pressurized water reservoir chamber, said tube bundle being mounted on said tube plate, and a water guide cylinder surrounding said tube bundle and formed at the peripheral surface thereof with radially extending inlet openings into said tube bundle for the water that is to be vaporized, the tubes of said tube bundle being arrayed so as to form a free passage above said pressurized water distributing chamber in at least one region extending rectilinearly between the middle of the tube bundle and one of said inlet openings for the water that is to be vaporized.

2. Steam generator according to claim 1 wherein said pressurized water distributing chamber and said pressurized water reservoir chamber located below said tube plate are separated by a partition, and including a pressurized water inlet connected to said distributing chamber and a pressurized water outlet connected to said reservoir chamber, said partition being disposed asymmetrically between said inlet and said outlet, and said free passage being thereby located only at the pressurized water inlet side of the generator.

3. Steam generator according to claim 1 wherein a plurality of the tubes of said tube bundle adjacent said free passage are formed with forked sections above said inlet openings for the water that is to be vaporized, and including additional tubes connected to said forked sections in a space above said free passage, said additional tubes below said forked sections having substantially double the cross section, respectively of the tubes of said tube bundle.

* * * * *